United States Patent
Hosein (10) Patent No.: US 8,046,019 B2
(45) Date of Patent: Oct. 25, 2011

(54) METHOD AND SYSTEM FOR OPTIMAL ALLOCATION OF UPLINK TRANSMISSION POWER IN COMMUNICATION NETWORKS

(75) Inventor: Patrick Hosein, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1141 days.

(21) Appl. No.: 11/773,395

(22) Filed: Jul. 3, 2007

(65) Prior Publication Data

US 2008/0032732 A1 Feb. 7, 2008

Related U.S. Application Data

(60) Provisional application No. 60/835,573, filed on Aug. 4, 2006.

(51) Int. Cl.
*H04B 7/00* (2006.01)

(52) U.S. Cl. .................. 455/522; 455/63.1; 455/67.11; 455/69

(58) Field of Classification Search .................. 455/522
See application file for complete search history.

(56) References Cited

U.S. PATENT DOCUMENTS

| | | | | |
|---|---|---|---|---|
| 5,844,983 | A * | 12/1998 | Lilja | 379/418 |
| 6,580,920 | B2 * | 6/2003 | Kalliojarvi | 455/522 |
| 6,591,110 | B1 * | 7/2003 | Kim et al. | 455/453 |
| 6,603,985 | B1 * | 8/2003 | Ichihashi | 455/567 |
| 6,628,956 | B2 * | 9/2003 | Bark et al. | 455/522 |
| 6,735,420 | B2 * | 5/2004 | Baldwin | 455/127.2 |
| 6,760,567 | B1 * | 7/2004 | Jeong et al. | 455/67.11 |
| 6,882,860 | B1 * | 4/2005 | Kim | 455/553.1 |
| 7,089,041 | B2 * | 8/2006 | Huang | 455/567 |
| 7,162,267 | B2 * | 1/2007 | Kim | 455/553.1 |
| 7,218,948 | B2 * | 5/2007 | Laroia et al. | 455/522 |
| 7,313,124 | B2 * | 12/2007 | Lim et al. | 370/342 |
| 7,333,604 | B2 * | 2/2008 | Zernovizky et al. | 379/392.01 |
| 7,519,036 | B2 * | 4/2009 | Zhang | 370/338 |
| 7,529,550 | B2 * | 5/2009 | Li | 455/456.1 |
| 7,676,198 | B2 * | 3/2010 | Mahany | 455/69 |

(Continued)

OTHER PUBLICATIONS

Ghosh, Arunabha et al., "Broadband Wireless Access With WiMax/802.16: Current Performance Benchmarks and Future Potential," IEEE Communications Magazine, pp. 129-136, Feb. 2005.

(Continued)

*Primary Examiner* — Yuwen Pan
*Assistant Examiner* — Hai Nguyen
(74) *Attorney, Agent, or Firm* — Slater & Matsil, L.L.P.

(57) ABSTRACT

A method for determining transmission power for a user in a network. The method includes receiving a plurality of interference indicators by a user which is associated with a sector. The plurality of interference indicators corresponds to a plurality of sectors respectively each associated with one of a plurality of users and a base station. The method further includes processing at least information associated with the plurality of interference indicators and selecting an interference indicator based on at least information associated with the plurality of interference indicators. The selected interference indictor corresponds to one of the plurality of sectors. Additionally, the method includes determining a gain indicator corresponding to both the user and the one of the plurality of sectors, and processing information associated with the gain indicator. Moreover, the method includes determining a transmission power of the user based on at least information associated with the gain indicator and the selected interference indictor.

40 Claims, 5 Drawing Sheets

U.S. PATENT DOCUMENTS

| | | | |
|---|---|---|---|
| 7,689,203 B2 * | 3/2010 | Zhang et al. | 455/406 |
| 7,689,240 B2 * | 3/2010 | Anderson | 455/522 |
| 7,701,911 B2 * | 4/2010 | Soliman | 370/335 |
| 7,702,342 B2 * | 4/2010 | Duan | 455/466 |
| 7,702,351 B2 * | 4/2010 | Soliman | 455/522 |
| 7,706,389 B2 * | 4/2010 | Liu | 370/401 |
| 7,738,907 B2 * | 6/2010 | Xiao et al. | 455/522 |
| 7,742,444 B2 * | 6/2010 | Mese et al. | 370/318 |
| 7,752,128 B2 * | 7/2010 | Shan | 705/39 |
| 2002/0077138 A1 * | 6/2002 | Bark et al. | 455/522 |
| 2002/0172186 A1 * | 11/2002 | Larsson | 370/349 |
| 2003/0017837 A1 * | 1/2003 | Kalliojarvi | 455/522 |
| 2003/0114127 A1 * | 6/2003 | Baldwin | 455/245.1 |
| 2004/0166886 A1 * | 8/2004 | Laroia et al. | 455/522 |
| 2004/0166887 A1 * | 8/2004 | Laroia et al. | 455/522 |
| 2005/0135324 A1 * | 6/2005 | Kim et al. | 370/343 |
| 2005/0186933 A1 * | 8/2005 | Trans | 455/296 |
| 2005/0272440 A1 * | 12/2005 | Li | 455/456.1 |
| 2006/0083161 A1 * | 4/2006 | Laroia et al. | 370/208 |
| 2006/0089154 A1 * | 4/2006 | Laroia et al. | 455/456.2 |
| 2006/0092881 A1 * | 5/2006 | Laroia et al. | 370/331 |
| 2006/0094363 A1 * | 5/2006 | Kang et al. | 455/63.1 |
| 2006/0109826 A1 * | 5/2006 | Zhang | 370/338 |
| 2006/0183495 A1 * | 8/2006 | Soliman | 455/522 |
| 2006/0209721 A1 * | 9/2006 | Mese et al. | 370/254 |
| 2006/0286995 A1 * | 12/2006 | Onggosanusi et al. | 455/522 |
| 2007/0018786 A1 * | 1/2007 | Shan | 340/5.4 |
| 2007/0070908 A1 * | 3/2007 | Ghosh et al. | 370/236 |
| 2007/0104164 A1 * | 5/2007 | Laroia et al. | 370/338 |
| 2007/0111746 A1 * | 5/2007 | Anderson | 455/522 |
| 2007/0115800 A1 * | 5/2007 | Fonseka et al. | 370/208 |
| 2007/0115861 A1 * | 5/2007 | Zhang et al. | 370/259 |
| 2007/0116139 A1 * | 5/2007 | Subramanian et al. | 375/260 |
| 2007/0123213 A1 * | 5/2007 | Wu | 455/406 |
| 2007/0149129 A1 * | 6/2007 | Das et al. | 455/67.11 |
| 2007/0178906 A1 * | 8/2007 | Gao et al. | 455/453 |
| 2007/0189215 A1 * | 8/2007 | Wu et al. | 370/331 |
| 2007/0195755 A1 * | 8/2007 | Li et al. | 370/352 |
| 2007/0213087 A1 * | 9/2007 | Laroia et al. | 455/522 |
| 2007/0225029 A1 * | 9/2007 | Abusch-Magder | 455/525 |
| 2007/0243876 A1 * | 10/2007 | Duan | 455/445 |
| 2007/0287454 A1 * | 12/2007 | Zhu et al. | 455/435.1 |
| 2007/0293260 A1 * | 12/2007 | Xiao et al. | 455/522 |
| 2008/0032732 A1 * | 2/2008 | Hosein | 455/522 |
| 2008/0039104 A1 * | 2/2008 | Gu et al. | 455/445 |
| 2008/0049705 A1 * | 2/2008 | Huang et al. | 370/342 |
| 2008/0070498 A1 * | 3/2008 | Tan et al. | 455/13.1 |
| 2008/0076465 A1 * | 3/2008 | Larsson | 455/522 |
| 2008/0076466 A1 * | 3/2008 | Larsson | 455/522 |
| 2008/0102844 A1 * | 5/2008 | Zhu et al. | 455/445 |
| 2008/0112383 A1 * | 5/2008 | Li | 370/342 |
| 2008/0112395 A1 * | 5/2008 | Zhu et al. | 370/352 |
| 2008/0112407 A1 * | 5/2008 | Liu | 370/389 |
| 2008/0175186 A1 * | 7/2008 | Liu et al. | 370/320 |
| 2008/0219183 A1 * | 9/2008 | Yin | 370/254 |
| 2008/0242339 A1 * | 10/2008 | Anderson | 455/522 |
| 2008/0248817 A1 * | 10/2008 | Gao et al. | 455/458 |
| 2008/0274739 A1 * | 11/2008 | Wu | 455/435.1 |
| 2009/0052327 A1 * | 2/2009 | Larsson et al. | 370/238 |
| 2009/0158442 A1 * | 6/2009 | Zhang | 726/28 |
| 2009/0170548 A1 * | 7/2009 | Soliman | 455/522 |
| 2009/0311968 A1 * | 12/2009 | Wigren | 455/67.13 |

OTHER PUBLICATIONS

Hosein, Patrick, "On the Optimal Scheduling of Uplink Resources in OFDMA-Based Wireless Networks," Proceedings of the 12$^{th}$ European Wireless Conference, 5 pages, Apr. 2006.

Hosein, Patrick, "On Uplink Interference Management for OFDMA Networks," 18$^{th}$ Annual IEEE International Symposium on Personal, Indoor and Mobile Radio Communications, 5 pages, 2007.

Hosein, Patrick, "Radio Resource Management for OFDMA Uplinks," 5 pages, no date.

Kumaran, Krishnan et al., "Uplink Scheduling in CDMA Packet-Data Systems," IEEE INFOCOM, 9 pages, 2003.

Oh, Seong Jun et al., "QoS-Constrained Information-Theoretic Sum Capacity of Reverse Link CDMA Systems," IEEE Transactions on Wireless Communications, vol. 5, No. 1, pp. 3-7, Jan. 2006.

Third Generation Partnership Project 2, "Joint Proposal for 3GPP2 Physical Layer for FDD Spectra," Contribution C30-20060731-040R4, 84 pages, Jul. 31, 2006.

* cited by examiner

PRIOR ART

Network map

METHOD AND SYSTEM FOR OPTIMAL ALLOCATION OF UPLINK TRANSMISSION POWER IN COMMUNICATION NETWORKS

CROSS-REFERENCES TO RELATED APPLICATIONS

This application claims priority to U.S. Provisional Patent Application No. 60/835,573, filed on Aug. 4, 2006, commonly assigned, incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention generally relates to telecommunication techniques. More particularly, the present invention relates to a method for providing a scheme for network users to manage their transmission powers and inter-sector interferences in uplink wireless communications. More specifically, embodiments of the present invention allows optimal allocation of uplink transmission power for each user with fair management of inter-sector interference in an Orthogonal Frequency Division Multiple Access (OFDMA) network. But it would be recognized that the invention has a much broader range of applicability.

The next generation of wireless networks will use OFDMA (Orthogonal Frequency Division Multiple Access) technology for a user attached with an access terminal (AT) in the uplink network communication. In OFDMA, the uplink resources assigned to a user are called tiles each of which consists of a subset of consecutive subcarriers. Since at most one user is assigned to each of these tiles then uplink transmissions within a sector are orthogonal or have no interference. However, the user AT transmission is still affected by inter-sector interference since other users in adjacent sectors may also have been assigned to the same tile. If those users in the adjacent sectors transmitted with high power then the inter-sector interference may severely limit the signal to interference and noise ratio (SINR) achieved by the user. Therefore, user transmission powers must be carefully managed to avoid excessive inter-sector interference.

Figure 1:
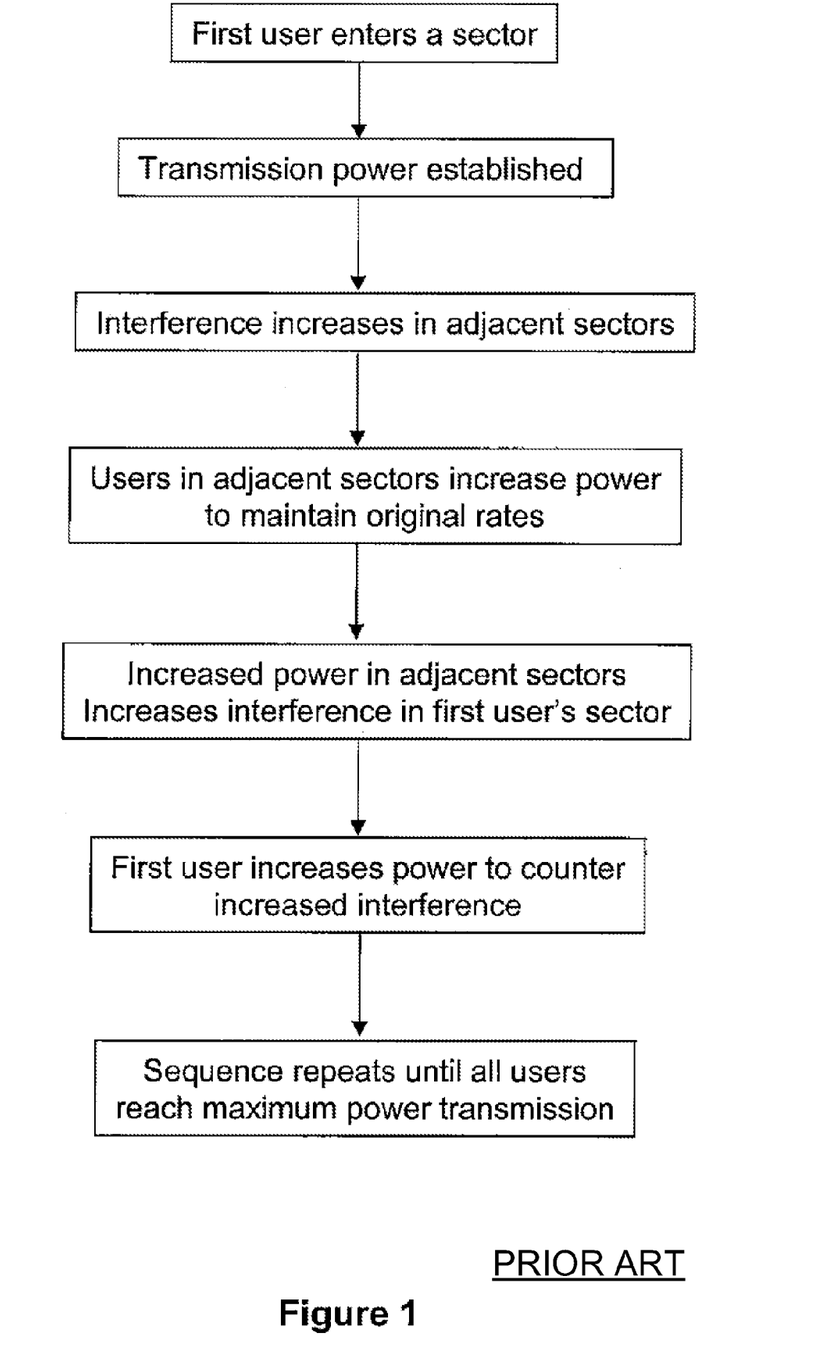
FIG. 1 is a simplified flowchart illustrating a conventional method of adjusting user transmission power in communication network.

For example, FIG. 1 illustrates a conventional method for dealing with transmission power adjustment for multiple users to achieve higher rates in the uplink of an OFDMA network. As shown, considering one of the users, and the user corresponds to a sector:

The transmission power of the user is increased for achieving a higher rate;

The interference caused by the user on adjacent sectors increases;

Users in adjacent sectors increase their powers to counter the increased interference and maintain their original rates;

The increased power of users in the adjacent sectors results in an increase in the interference in the sector;

The user must increase power to counter this increased interference; and

The sequence of events repeats until the user reaches its maximum transmission power.

Such an approach leads to a result that all users transmit with maximum power which is not an optimal use of uplink resources. Instead, system stability is better maintained by controlling user uplink transmission powers so as to maintain the interference at each sector within an acceptable range. In other words, in the uplink of an OFDMA network, the user AT transmission power must be chosen large enough to provide the desired rate for the user, but not too high to significantly degrade transmissions in neighboring sectors because of the interference caused to those transmissions.

In general, simply maintaining interference level within a set limit will not result in an optimal or fair solution. For example, consider a simple case of two sectors with two users. Even if only one user is transmitting, its rate is limited because of the limit placed on the interference it causes on the second sector. Clearly this is not optimal. Furthermore, suppose adding a third sector and that a user in that sector wishes to transmit. Then the user in the first sector is transmitting with sufficient power to cause the interference limit on the second sector to be reached. The third user then cannot transmit because doing so will cause the interference constraint for the second sector to be violated. This demonstrates that the system may not be fair. If the user in the third sector had instead started transmitting before the user in the first sector then the user in the first sector would similarly not be able to transmit. Hence the solution is non-unique and this may potentially result in instability.

Within a framework of the Third Generation Partnership Project 2 (3GP2), the inter-sector interference information is broadcast by sectors and can be used by ATs to adjust powers. Certain conventional techniques based on the framework for dealing the above problem are often not adequate for various reasons. For example, some central entity may require to collect all information associated with the AT transmissions and interferences, then compute the solution and inform each sector of this solution, or each sector must combine this information then determine an optimal solution. These conventional solutions require the exchange of a large amount of information and the delay in collecting this information may mean that the computed solution is no longer optimal when applied.

Therefore, an improved technique based on a distributed algorithm for providing optimal allocation of uplink transmission power is desired.

BRIEF SUMMARY OF THE INVENTION

The present invention generally relates to telecommunication techniques. More particularly, the present invention relates to a method for providing a scheme for network users to manage their transmission powers and inter-sector interferences in uplink wireless communications. More specifically, embodiments of the present invention allow optimal allocation of uplink transmission power for each user with fair management of inter-sector interference in an Orthogonal Frequency Division Multiple Access (OFDMA) network. But it would be recognized that the invention has a much broader range of applicability.

In a specific embodiment, the present invention provides a method for determining transmission power for a user in a network. The method includes receiving a plurality of interference indicators by a user which is associated with a sector. The plurality of interference indicators corresponds to a plurality of sectors respectively each associated with one of a plurality of users and a base station. The method further includes processing at least information associated with the plurality of interference indicators. Additionally, the method includes selecting an interference indicator based on at least information associated with the plurality of interference indicators. The selected interference indictor corresponds to one of the plurality of sectors. The method further includes determining a gain indicator corresponding to both the user and the one of the plurality of sectors and processing information associated with the gain indicator. Moreover, the method includes determining a transmission power of the user based on at least information associated with the gain indicator and the selected interference indictor.

In another specific embodiment, the present invention provides a method for determining transmission power for a user in a network. The method includes receiving a first plurality of interference indicators for a first control period by a user which is associated with a sector. The first plurality of interference indicators corresponds to a first plurality of sectors respectively each being associated with one of a first plurality of users and a first base station. Additionally, the method includes processing at least information associated with the first plurality of interference indicators and selecting a first interference indicator for the first control period based on at least information associated with the first plurality of interference indicators. The selected first interference indictor corresponds to one of the first plurality of sectors. The method further includes determining a first gain indicator for the first control period corresponding to both the user and the one of the first plurality of sectors and processing information associated with the first gain indicator. Moreover, the method includes determining a first uplink transmission power for a second control period based on at least information associated with the first gain indicator and the selected first interference indictor. The second control period is a time duration that immediately follows the first control period.

In yet another specific embodiment of the present invention, the method further includes receiving a second plurality of interference indicators for the second control period by the user. The second plurality of interference indicators corresponds to a second plurality of sectors respectively each being associated with one of a second plurality of users and a second base station. Additionally, the method includes processing at least information associated with the second plurality of interference indicators and selecting a second interference indicator for the second control period based on at least information associated with the second plurality of interference indicators. The selected second interference indictor corresponds to one of the second plurality of sectors. The method further includes determining a second gain indicator for the second control period corresponding to both the user and the one of the second plurality of sectors. Furthermore, the method includes processing information associated with the second gain indicator and determining a second uplink transmission power for a third control period based on at least information associated with the second gain indicator and the selected second interference indicator. The third control period is another time duration that immediately follows the second control period.

In yet still another specific embodiment, the present invention provides a system for determining transmission power for a user in a network. The system includes one or more components configured to receive a plurality of interference indicators by a user which is associated with a sector. The plurality of interference indicators corresponds to a plurality of sectors respectively each being associated with one of a plurality of users and a base station. The one or more components are further configured to process at least information associated with the plurality of interference indicators and select an interference indicator based on at least information associated with the plurality of interference indicators. The selected interference indictor corresponds to one of the plurality of sectors. Additionally, the system is configured to determine a gain indicator corresponding to both the user and the one of the plurality of sectors, process information associated with the gain indicator, and iteratively determine an uplink transmission power based on at least information associated with the gain indicator and the selected interference indictor.

Numerous benefits may be achieved over pre-existing techniques using the present invention. In particular, embodiments in accordance with the present invention use a distributed algorithm in which each sector independently computes power allocation decision for the associated user based on local sector information. Certain embodiments of the present invention achieve high performance by operating the network system near the interference limit of an interference-limited sector. Other embodiments of the present invention also achieve fairness of the power allocation for each of the plurality of users within the system. Furthermore, some embodiments of the present invention provide an stable algorithm for managing the uplink transmission power allocation. For example, once a steady state is achieved, each AT continues to operate at the steady state power allocation until some change in the system occurs. Changes will of course occur because of variations in the radio conditions of each AT. Depending upon the embodiment, one or more of these benefits may be achieved. These and other benefits may be described throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention generally relates to telecommunication techniques. More particularly, the present invention relates to a method for providing a scheme for network users to manage their transmission powers and inter-sector interferences in uplink wireless communications. More specifically, embodiments of the present invention allows optimal allocation of uplink transmission power for each user with fair management of inter-sector interference in an Orthogonal Frequency Division Multiple Access (OFDMA) network. But it would be recognized that the invention has a much broader range of applicability.

The uplink frame of an OFDMA network consists of a set of tiles. Each tile consists of a set of subcarriers. In some cases these subcarriers may be spread over the entire bandwidth to provide frequency diversity for the corresponding transmissions. In other cases the tile consists of a subset of consecutive subcarriers and the channel conditions as well as the interference being experienced within this band of subcarriers is used for making resource management decisions. The latter type of tile construction provides a layout that is more appropriate for data transmissions. Each tile within a frame must be assigned to at most one user in the corresponding sector. For the centralized case, optimization of resources must be performed over all users in the network and for each frame of each sector. This optimization can be very signaling intensive.

According to one embodiment of the present invention, for each tile an optimal user is first determined by making use of sector specific information only. In this way each tile assignment can be made independently in each sector. Scheduling algorithms are available for making these decisions based on the reverse link channel quality of each AT together with other information such as queue sizes and quality of services (QoS) guarantees. Once a user is assigned to a tile, the next step is the determination of the transmission power that should be used by the user for the transmission. This power depends on the expected interference that will be experienced by the transmitted packet. The interference depends on which users are allocated in neighboring sectors as well as the power that they each use.

Figure 2:
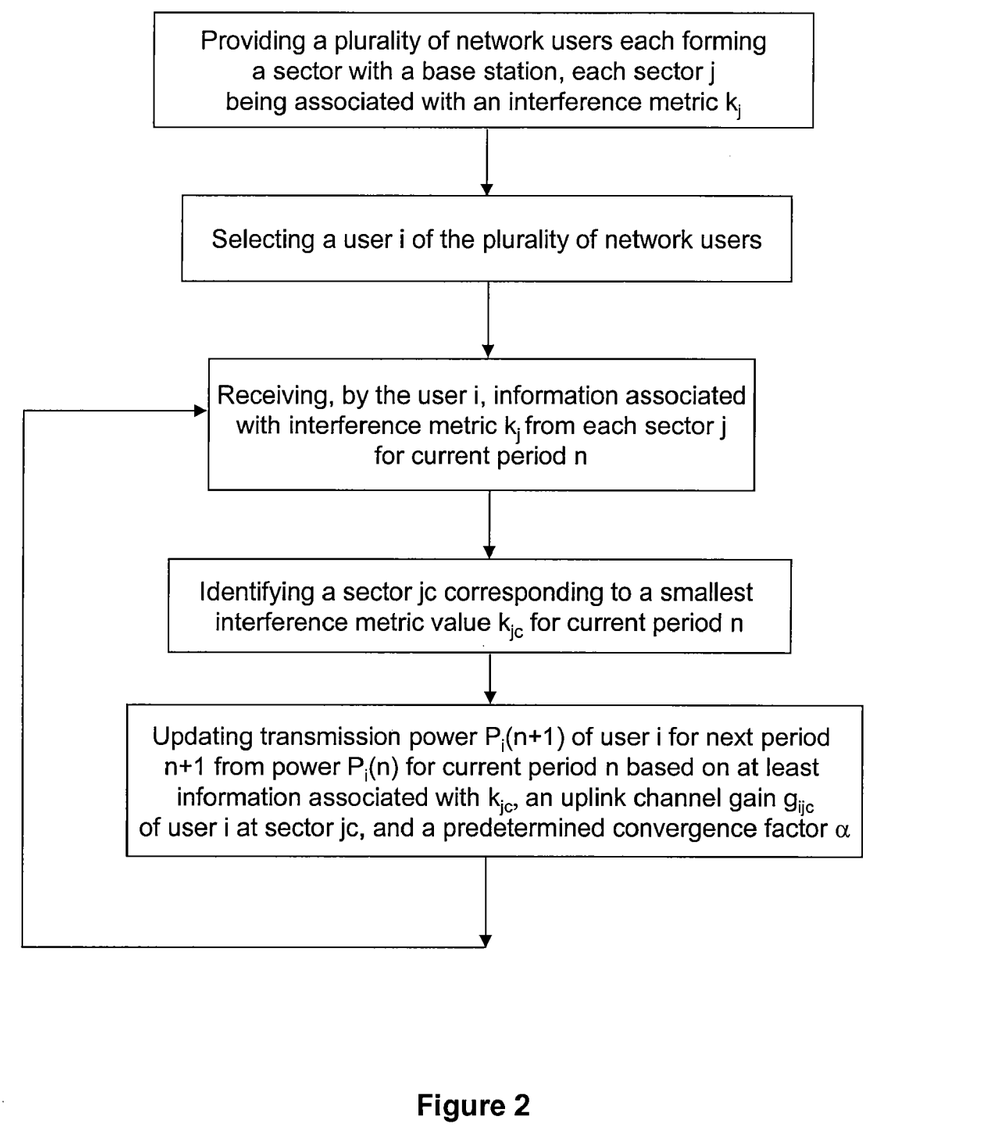
FIG. 2 is a simplified flowchart illustrating a method for optimal allocation of uplink transmission power in communication network according to an embodiment of the present invention.

Embodiments of the present invention provide a method of determination of the transmission power of the user in a specific sector for each sector and each control period. FIG. 2 is a simplified flowchart illustrating a method for optimal allocation of uplink transmission power in communication network according to an embodiment of the present invention. This diagram is merely an example, which should not unduly limit the scope of the claims herein. One of ordinary skill in the art would recognize other variations, modifications, and alternatives. As shown, the method 200 of allocating a user uplink transmission power can be outlined as follows:

1. Process 210: Providing a plurality of network users each forming a sector with a base station, each sector j being associated with an interference metric $K_j$;

2. Process 220: Selecting a user i of the plurality of network users;

3. Process 230: Receiving, by the user i, information associated with an interference metric $\kappa_j(n)$ from each sector j for current period n;

4. Process 240: Identifying a sector jc corresponding to a smallest interference metric $\kappa_{jc}(n)$ for current period n;

5. Process 250: Updating transmission power $P_i(n+1)$ of user i for next period n+1 from power $P_i(n)$ for current period n based on at least information associated with $\kappa_{jc}(n)$, an uplink channel gain $g_{ijc}$ of user i at sector jc, and a predetermined convergence factor $\alpha$; and 6. Repeat Process 230 and forward.

These sequences of processes provide a way of performing a method according to an embodiment of the present invention. As shown, the method can be implemented based on a distributed algorithm independent for a user i operated in parallel with a plurality of network users within the tile. Some processes may be performed in different order. Some processes can be removed or added. Of course, there can be variations, modifications, and alternatives.

In one embodiment of the present invention, the power allocation for a specific tile is considered. It is assumed that N sectors within the tile is provided and each sector is associated with at least a user, as shown in process 210 of the method 200. Here, N may be any integer larger than 1. In particular, a single user i, i being any one among 1 to N, is chosen in each sector to transmit a sequence of frames over the tile. Since there is a one to one correspondence between user and sector the same index are used for both network identities according to an embodiment of the present invention. In one embodiment, let $g_{ij}$ denote the average channel gain from user i to sector j. Therefore if user i transmits with power $p_i$ then the received signal strength at sector i is $p_i g_{ij}$ while the interference it incurs on sector j≠i is $p_i g_{ij}$. In one embodiment, the channel gain g varies with time. In another embodiment, the channel gain g is static for the time period of concern. In yet another embodiment, the channel gain is updated by the user based on an estimation from a forward link pilot of the one of the plurality of sectors. The inter-sector interference experienced by sector j is then defined by $$I_j = \sum_{i=1, i \neq j}^{N} p_i g_{ij}$$

The background noise experienced at sector j is denoted by $N_j$ and so the total interference plus noise is $I_j + N_j$.

Given some objective, e.g., to maximize total system uplink throughput, one can formulate the corresponding optimization problem and determine the optimal solution. However, because of the high interdependence between the decision variables the determination of the optimal solution requires global information and hence a centralized approach. According to certain embodiment, excessive interference results in reduced user rates and hence the optimal solution typically lies within a region where the interference experienced by each base station is bounded with a predetermined interference limit. Additionally, this only holds for the case where a user is scheduled in each sector. If a tile is not scheduled within a specific sector then the amount of interference experienced in that sector over the tile is irrelevant and need not be limited. However typically an interference limit throughout the system is enforced since under heavy loading all sectors will schedule a user on the tile. Therefore, according to a preferred embodiment, a distributed algorithm can be used with focus on each local sector information if the interference limited sector is identified. Of course, there are other alternatives, variations, and modifications.

In certain embodiments, each base station broadcasts its interference level (typically referred to as the Other Sector Interference or OSI level) and accordingly users in its neighboring sectors adjust transmission power levels to maintain the interference at or below some limit. In general this should prevent operation of the system in undesirable (high interference levels) regions. In other embodiments, the rate achieved by a user in a sector grows with the received SINR of the transmitted packet. The signal is dependent on the transmission power used by the user and the uplink channel conditions. In a specific embodiment, the total inter-sector interference plus thermal noise is set by a limit $I_{max}$ such that $$I_j + N_j \leq I_{max}$$

for all sectors j. Based on this predetermined interference limit, a interference metric for each sector can be defined:

$$\kappa_j(n) \equiv \frac{I_{max} - N_j(n)}{I_j(n)}$$

which is broadcast by sector j at an end of control period n.

In another embodiment of the invention, the maximum transmission power of each user can be denoted by P and let $0<\gamma(n)<1$ denote the fraction of this power used for packet transmissions during the period n. Here n is numerical index for representing a time duration for controlling/adjusting the user transmission power. The transmission power used in period n is therefore given by $P\gamma(n)$ and the problem is to determine the value for $\gamma(n)$ for each period so that the interference constraint is satisfied at each base station.

In a specific embodiment, the method 200 provides a method for determining the allocations for a subsequent period based on give allocations for a present period n. In process 230, the user i receives an interference metric broadcast from each sector for current period n. For the specific sector j, the inter-sector interference experienced by this sector is the sum of all relative powers associated with the channel gain of all users from sectors other than the sector j:

$$I_j(n) = \sum_{i=1, i \neq j}^{N} P\gamma_i(n) g_{ij}.$$

In a resource limited system, a fair allocation is one in which all users of the limited resource are provided with an equal allocation of that resource. In an embodiment of the present invention the concerned resource is the inter-sector interference. This resource becomes limited at a sector when it reaches its maximum value $I_{max}$. When this happens, all users that use this resource must be allocated the same share of interference. In another embodiment, all users in the system is limited by this sector j since none can increase their transmission power without causing the interference constraint to be violated.

In a specific embodiment, the user i may be associated with one by those sectors from which it receives an interference report broadcast. All other sectors are sufficiently far away so that its influence can be ignored.

In one embodiment, since there are total N users in the system then each should incur an interference of at most $(I_{max}-N_j)/N$ on the resource limited sector. However, there is also a limit (denoted by $p_{max}$) on the maximum transmission power of the user. Those users that become power limited cannot contribute their share of interference and hence the "excess" interference is available to other users who can use it. Therefore, all users which are not power limited should be allocated the same interference share and their total share is the amount that is left over from the total interference of the power limited users.

Embodiments of the present invention provide a method of determination of the transmission power $P\gamma_i(n)$ of the user i that is not power limited for each sector and each control period. In process 240 for current period n, a critical sector j is identified by determining, among all the interference metric $\kappa_j(n)$ received by the user i, the smallest interference metric value so that $\kappa_j(n) \leq \kappa_i(n)$, for all $i \neq j$. In one embodiment, the uplink transmission power fraction $\gamma_i$ for the user i is iteratively updated as Eq. (1) with following form $$\gamma_i(n+1) = \gamma_i(n) \frac{I_{max} - N_j(n)}{I_j(n)} (1 - \alpha P \gamma_i(n) g_{ij}). \quad (1)$$

Here the power fraction $\gamma_i(n+1)$ for the next period n+1 is derived based on the power fraction $\gamma_i(n)$ for the current period n, multiplying the interference metric for the critical sector j and another quantity related to channel gain $g_{ij}$ for the user i at the critical sector j and a factor $\alpha$.

In one embodiment, factor $\alpha=0$, then the Eq. (1) becomes $$\gamma_i(n+1) = \gamma_i(n) k_j(n) = \gamma_i(n) \frac{I_{max} - N_j(n)}{I_j(n)}$$

and the interference experienced by sector j in period n+1 is then given by $$I_j(n+1) = \sum_{i=1,i\neq j}^{N} P\gamma_i(n+1) g_{ij}$$
$$= \sum_{i=1,i\neq j}^{N} P\gamma_i(n) g_{ij} \frac{I_{max} - N_j(n)}{I_j(n)}$$
$$= I_{max} - N_j(n)$$

Therefore the interference plus thermal noise for sector j becomes equal to the maximum value.

Consider any other sector $k \neq j$. The resulting interference for this sector is given by $$I_k(n+1) = \sum_{i=1,i\neq k}^{N} P\gamma_i(n) g_{ik} \frac{I_{max} - N_j(n)}{I_j(n)}$$
$$= I_k(n) \frac{I_{max} - N_j(n)}{I_j(n)}$$
$$= \frac{I_{max} - N_k(n)}{\kappa_k(n)} \kappa_j(n)$$
$$= I_{max} - N_k(n)$$

Therefore the total interference and noise for all other sectors remain at most $I_{max}$ and so all sectors continue to satisfy their interference constraints with at least one of them satisfying it with equality. In one embodiment, as expected the transmission power for user i is higher at the next period. In another embodiment, this derivation holds even if $\kappa_j(n)<1$. This would occur when the interference plus thermal noise exceeds the specified interference limit. In this case $\kappa_j(n+1)$ for the next period will be set at a lower value than $\kappa_j(n)$. In other words, the sector j become a interference limited sector and for each user the power is updated with the interference constraint satisfied for each sector through the limit $I_{max}$. For example, for the provided N sectors, the user i receives all interference metric $\kappa_j$, $j=1, 2, \ldots, N$ for current period. Among all above sector j, a critical sector may be identified as jc with a smallest value of $\kappa_{jc}$ corresponding to a largest inter-sector interference including a contribution from the user i due to the channel gain $g_{ijc}$.

In another embodiment, a non-zero value of the factor $\alpha$ in Eq. (1) provides an additional adjustment of the power allocated to a user. As shown, the additional adjustment is based on the interference by the user i presently incurring on the interference limited sector j, for example, the sector jc. In yet another embodiment, the effect of the additional adjustment provide a fairness effect for the power allocation which can be illustrated by considering a steady state point reached through iteration. For example, when the system settles to some steady state and the interference limited sector jc is now denoted by $\tilde{j}$, and also denote the limiting value of $\gamma(n)$ by $\tilde{\gamma}$. Therefore in steady state we have $$\tilde{\gamma}_i = \tilde{\gamma}_i \frac{I_{max} - N_{\tilde{j}}}{I_{\tilde{j}}} (1 - \alpha P \tilde{\gamma}_i g_{i\tilde{j}})$$

In one embodiment, for those users that are power limited, their transmission power in steady state is simply P. In another embodiment, for those users that are not power limited their transmission power will be updated as $P\tilde{\gamma}$. The inter-sector interferences based on corresponding channel gains on each of those sectors can then be expressed as follows, $$P\tilde{\gamma}_i g_{i\tilde{j}} = \frac{1}{\alpha}\left(1 - \frac{I_{\tilde{j}}}{I_{max} - N_{\tilde{j}}}\right).$$

This implies that, in the limit, the interference produced on the interference limited sector by user i is the same for all users. Therefore in steady state the power allocation is fair, i.e. all users that are not power limited incur the same interference on the constrained sector.

In another embodiment, if $\alpha>0$ then $I_{\tilde{j}} < I_{max} - N_{\tilde{j}}$, since from Eq. (1) the power allocated to each user is strictly less than the amount required to maintain the interference plus noise at $I_{max}$ so that $I_{\tilde{j}} + N_{\tilde{j}}$ will also be less than $I_{max}$. In yet another embodiment, as $\alpha$ is increased, $I_{\tilde{j}}$ decreases and hence the system operates further away from a system capacity which is defined as the point where the interference limit constraint is binding. Therefore, the factor $\alpha$ also provides a convergence effect by determining how close the interference limited sector operates near the limit and hence how efficiently the system resources are utilized.

Certain embodiments of the present invention in terms of the factor $\alpha$ determines how quickly the system is able to converge to the steady state in which fairness is achieved. In one embodiment, the factor $\alpha$ must be chosen to achieve the desired trade-off between efficiency and fairness. For example, as $\alpha$ is increased, the operating point $I_{\tilde{j}} + N_{\tilde{j}}$ decreases. Therefore a newly entering user (which starts off with sufficient power to achieve some initial minimum rate) will be able to more rapidly rise to its steady state value based on the power update scheme shown in Eq. (1) according to the embodiment of the invention. The user transmission rate at the steady state will, of course, depend on how close the user lies to the interference limited sector. If the user lies close to this sector then its channel gain to the sector will be high and so it will be limited to a sufficiently small power because of its quota on the interference it incurs. Therefore the rate it will be able to achieve will be limited. If on the other hand the user lies far away from the interference limited sector then the channel gain to that sector will be small. Then the user will be allowed to use more power and so its rate will be limited by its maximum transmission power.

Many benefits may be achieved over pre-existing techniques using the present invention. For example, certain embodiments of the present invention based on the distributed algorithm provide high performance with fairness by operating near the interference limit of the interference limited sector. Furthermore, some embodiments of the invention ensure that the algorithm is also stable. Once steady state is achieved, each user connecting through AT continues to operate at the steady state power allocation until some change in the system occurs. Of course, there can be variations, alternatives, and modifications. For example, changes may occur because of variations in the radio conditions of each AT.

Certain embodiments of the present invention provides a system for determining transmission power for a user in a network. The system includes one or more components configured to receive a plurality of interference indicators by a user which is associated with a sector. The plurality of interference indicators corresponds to a plurality of sectors respectively each being associated with one of a plurality of users and a base station. The one or more components are further configured to process at least information associated with the plurality of interference indicators and select an interference indicator from the plurality of interference indicators based on at least information associated with the plurality of interference indicators. The selected interference indicator corresponds to one of the plurality of sectors. Additionally, the system is configured to determine a gain indicator corresponding to both the user and the one of the plurality of sectors, process information associated with the gain indicator, and iteratively determine an uplink transmission power based on at least information associated with the gain indicator and the selected interference indicator.

Figure 3:
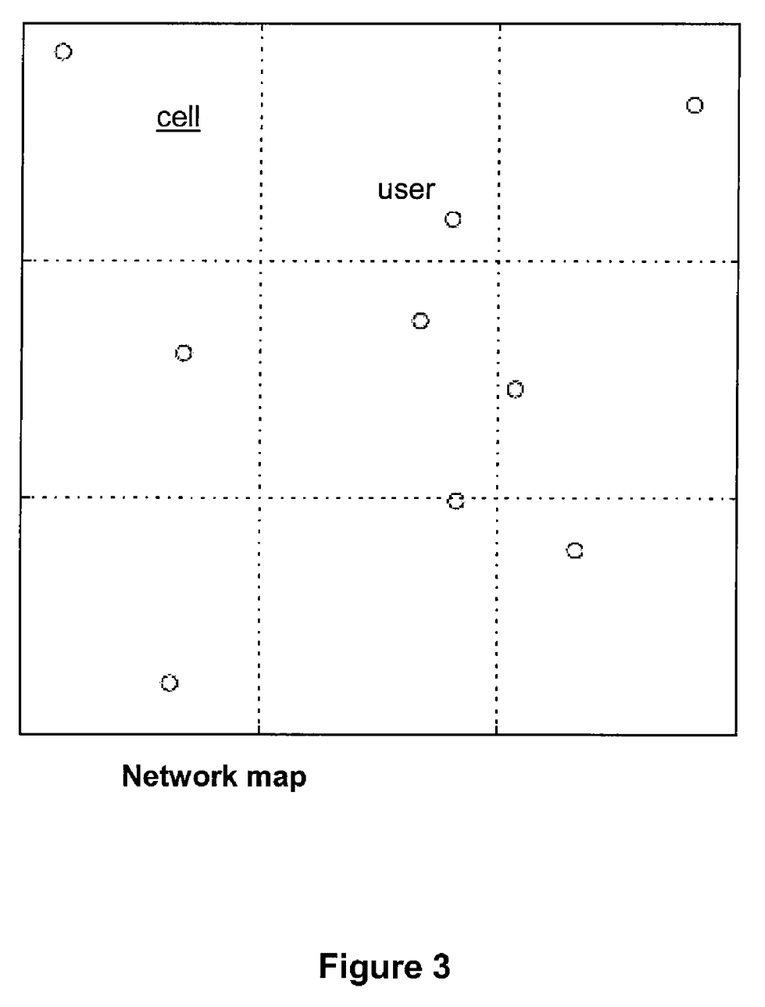
FIG. 3 is a simplified schematic diagram illustrating a simulated location map of multiple access terminals in cells according to a specific embodiment of the present invention.

Some embodiments of the present invention can be illustrated by performing certain simulations to demonstrate high performance, fairness and stability of the user uplink transmission power allocation based on the system. For example, one simplified simulation model is provided. FIG. 3 is a simplified schematic diagram illustrating a simulated location map of multiple access terminals in cells according to a specific embodiment of the present invention. This diagram is merely an example, which should not unduly limit the scope of the claims herein. One of ordinary skill in the art would recognize other variations, modifications, and alternatives. As shown is a network with nine square cells with one sector per cell. A single user is randomly dropped in each of these cells, each represented by a circle. The cells from bottom left to top right are indexed. For a control period of 20 ms (i.e., 20 frames for 1 ms frame durations), the interference level of each cell is measured and reported to all other cells at the end of each control period. At the end of each control period the power allocations for the subsequent control period is obtained which is then used throughout the period. In one example, all cells are silent initially. At time t=2xs the user in the cell with index x starts transmitting. The user is initially allocated sufficient power to achieve a specified minimum rate.

Figure 4:
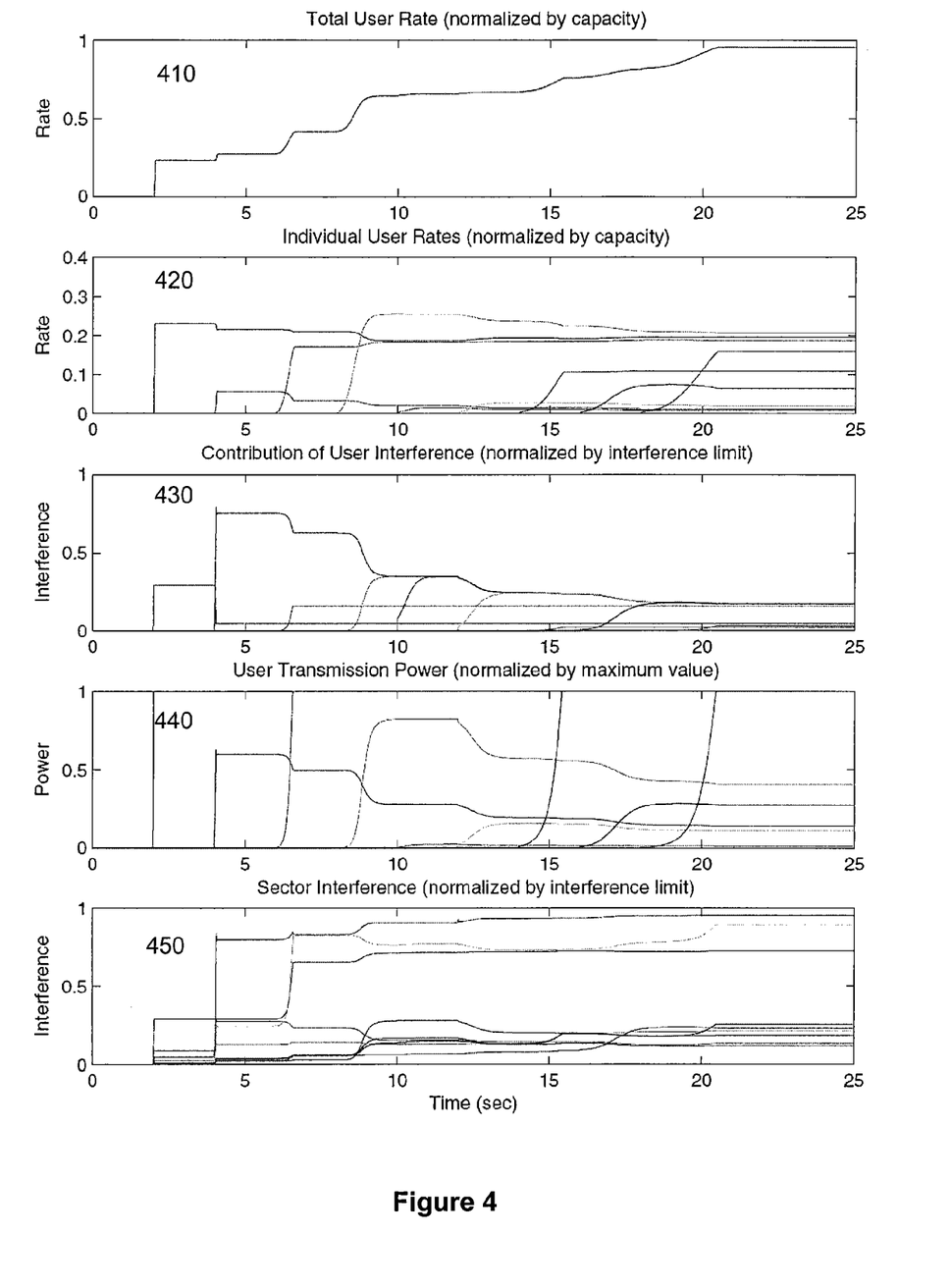
FIG. 4 is a simplified diagram showing simulation results based on the method provided by an embodiment of the present invention.

In one embodiment, the maximum rate achievable for total reverse link, which is called an uplink capacity, can be determined based on a simplified simulation model. FIG. 4 is a simplified diagram showing simulation results based on the method provided by an embodiment of the present invention. This diagram is merely an example, which should not unduly limit the scope of the claims herein. One of ordinary skill in the art would recognize other variations, modifications, and alternatives. As shown is five plots obtained from simulation of the previously described scenario. The first plot 410 contains a total achieved rate, normalized by the uplink capacity, as a function of time. In one example, once all users are transmitting, the system approaches capacity and gets within 5%. In another example, the system converges much faster when lightly loaded since more room is available for rate adjustments. In another example, even when fully loaded (at t=18s) convergence is achieved within 3s.

Referring to FIG. 4 again, the second plot 420 provides the individual user rates versus contributions of user interference normalized by interference limit. For example, the interference limit is $I_{max}$. The plot 420 shows that as more users are added, the rates of users already in the system decrease. The plot 420 also shows the correlation between rate and user location (see also FIG. 3).

The third plot 430 of FIG. 4 contains the interference contributed by each user towards the interference limited sector with a user power that is normalized by maximum value. For example, the maximum power value for the user is P. The users that are not power limited converge to a common value while the power limited users converge to values below this. Of course, there can be other variations, alternatives, and modifications.

The fourth plot 440 of FIG. 4 contains the transmission power of each user as a function of sector interference normalized by interference limit. For example, the plot 440 shows that the power limited users are the ones that do not achieve their share of interference on the interference limited sector. Of course, there can be other variations, alternatives, and modifications.

The fifth plot 450 in FIG. 4 contains the interference of each sector as a function of time. As shown, over a time span of 25 seconds, the interference limited sector converges to an interference value just below the maximum value (this interference includes the thermal noise) as expected for a non-zero value of factor α used in the simulations. Of course, there can be other variations, alternatives, and modifications. For example, the sequence used to add users to the system is varied in an alternative simulation case. All users are found to converge to the same rates as expected according to the method provided by certain embodiments of the invention.

Figure 5:
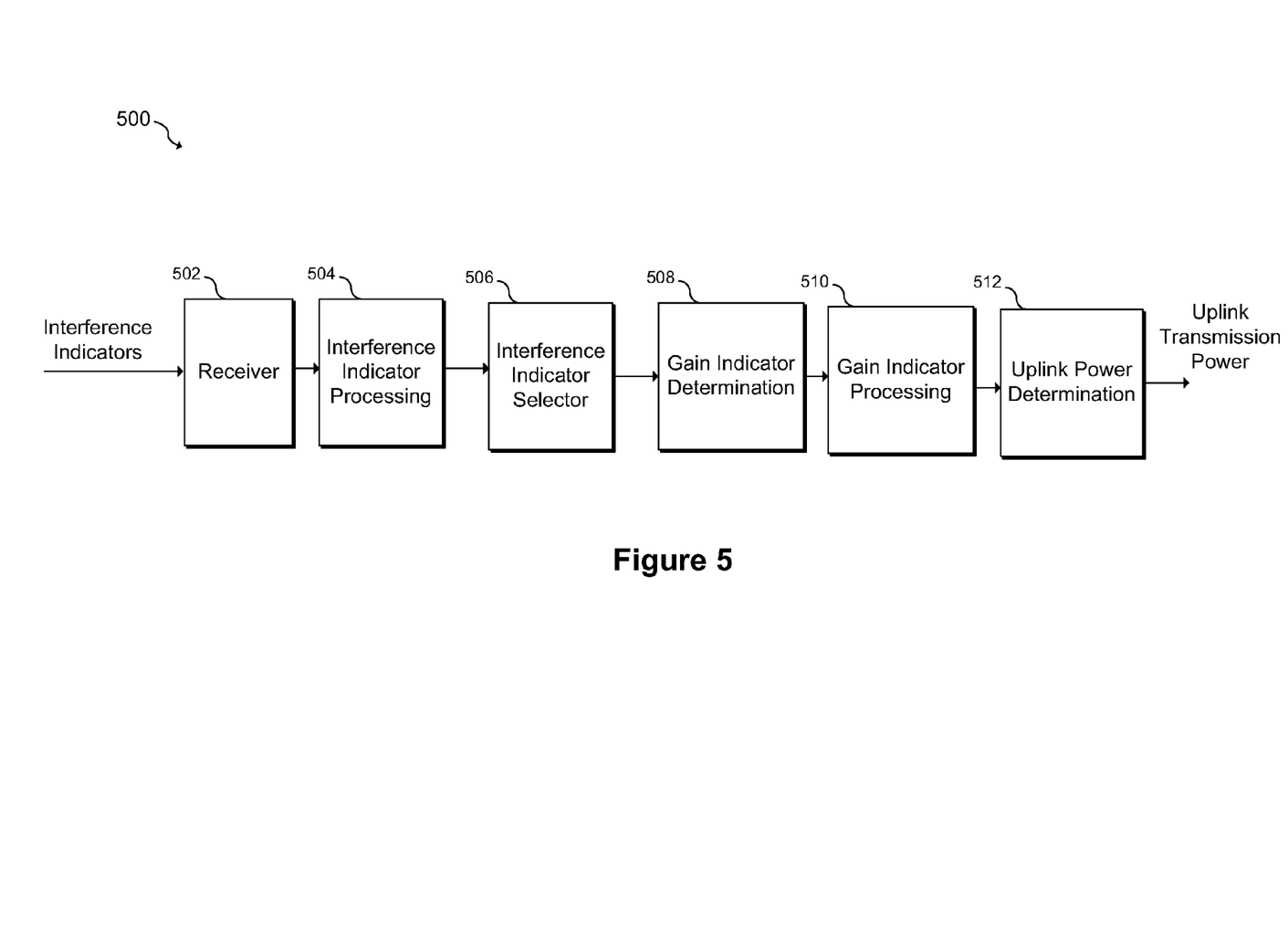
FIG. 5 illustrates an embodiment system for determining transmission power for a user in a network.

FIG. 5 illustrates system 500 for determining transmission power for a user in a network. The system has receiver 502 for receiving a plurality of interference indicators by a user, where the user is associated with a sector, and the plurality of interference indicators corresponds to a plurality of sectors respectively. Each of the plurality of sectors are associated with one of a plurality of users and a base station. The system further has interference indicator processing block 504 that processes at least information associated with the plurality of interference indicators. Interference indicator selector block 506 selects an interference indicator from the plurality of interference indicators based on at least information associated with the plurality of interference indicators, where the selected interference indicator corresponds to one of the plurality of sectors. Gain indicator determination block 508 determines a gain indicator corresponding to both the user and the one of the plurality of sectors. In indicator processing block 510 processes information associated with the gain indicator, and uplink power determination block determines an uplink transmission power based on at least information associated with the gain indicator and the selected interference indicator.

In an embodiment, a method for determining transmission power for a user in a network includes receiving, by a user, a plurality of interference indicators. The user is associated with a sector, and the plurality of interference indicators correspond to a plurality of sectors, respectively. Each of the plurality of sectors are associated with one of a plurality of users and a base station, and each of the plurality of interference indicators, respectively, corresponds to an interference metric $\kappa_j$ associated with one sector j, where j is an index for representing any one of the plurality of sectors, and wherein the interference metric $\kappa_j$ is broadcast by the sector j as a ratio of a quantity that equals to a predetermined interference constraint $I_{max}$ for the sector j subtracting a background noise $N_j$ at the sector j over inter-sector interferences $I_j$ experienced by the sector j from other sectors. The method also includes processing at least information associated with the plurality of interference indicators, and selecting an interference indicator from the plurality of interference indicators based on at least information associated with the plurality of interference indicators, where the selected interference indicator corresponds to one of the plurality of sectors. The method further includes determining a gain indicator corresponding to both the user and the one of the plurality of sectors, processing information associated with the gain indicator; and determining a transmission power of the user based on at least information associated with the gain indicator and the selected interference indicator.

In an embodiment, a user is denoted by index i ranging from 1 to N, with N being an integer larger than 1, and, in some embodiments, user comprises a mobile station connected with a communication network and/or the user comprises an access terminal in a sector of an orthogonal frequency division multiple access (OFDMA) network. In some embodiments, inter-sector interference $I_j$ includes a combined interference produced by all network users respectively associated with one of the plurality of sectors other than the sector j.

In an embodiment, selecting an interference indicator from the plurality of interference indicators comprises determining one sector jc corresponding to a smallest value of interference metric $\kappa_{jc}$ for a given control period. In some embodiments, determining the gain indicator includes determining a channel gain $g_{ijc}$ from user i to the determined sector jc.

In an embodiment, the transmission power of the user i is denoted as $P_i(m)$ for a control period in, $P_i(m)$ being equal to a maximum power value P multiplying an attenuation factor $\gamma_i(m)$ corresponding to the user i at the control period m, where m is index with consecutive integer numbers each representing one of a series of time durations for a user to adjust uplink transmission power in the network. Furthermore, in some embodiments, determining a transmission power of the user i is at least associated with determining an attenuation factor $\gamma_i(m+1)$ for a next control period m+1 iteratively based on the attenuation factor $\gamma_i(m)$ at the control period m. Moreover, determining a transmission power of the user i can be further associated with a convergence factor multiplying with channel gain $g_{ijc}$, where the convergence factor being a pre-determined constant α between 0 and 1. The transmission power of the user i is updated iteratively from a control period in to a next control period m+1 as follows:

$$P\gamma_i(m+1) = P\gamma_i(m)\kappa_j(m).$$

In an embodiment, a method for determining transmission power for a user in a network includes receiving, by a user, a first plurality of interference indicators for a first control period, where the user is associated with a sector, the first plurality of interference indicators corresponds to a first plurality of sectors respectively, and each of the first plurality of sectors are associated with one of a first plurality of users and a first base station. The method also includes processing at least information associated with the first plurality of interference indicators, and selecting a first interference indicator for the first control period from the first plurality of interference indicators based on at least information associated with the first plurality of interference indicators. The selected first interference indicator corresponds to one of the first plurality of sectors, where each of the first plurality of interference indicators is respectively associated with an interference metric $\kappa_{j1}$ broadcast by one sector j1 at an end of the first control period, j1 being an index for representing one of the first plurality of sectors.

In an embodiment, the interference metric $\kappa_{j1}$ is defined as a ratio of a quantity that equals to an interference constraint Imax1 predetermined for the sector j1 subtracting a background noise $N_{j1}$ at the sector j1 for the first control period over an inter-sector interference $I_{j1}$ experienced by the sector j1 at the first control period. The method also includes determining a first gain indicator for the first control period corresponding to both the user and the one of the first plurality of sectors, and processing information associated with the first gain indicator; and determining a first uplink transmission power for a second control period based on at least information associated with the first gain indicator and the selected first interference indicator.

In an embodiment, selecting a first interference indicator for the first control period from the first plurality of interference indicators includes determining a sector j1c corresponding to a value of $\kappa_{j1c}$, equal to or less than any $\kappa_{j1}$ for the sector j1 of the first plurality of sectors within the first control period. The first uplink transmission power for the second control period is denoted as $P_i(2)$ with i being index for representing the user, $P_i(2)$ being equal to a maximum power value P multiplying an attenuation factor $\gamma_i(2)$ corresponding to the user i at the second control period.

In an embodiment, the method also includes receiving, by the user, a second plurality of interference indicators for the second control period, the second plurality of interference indicators corresponding to a second plurality of sectors respectively, where each of the second plurality of sectors is associated with one of a second plurality of users and a second base station. The method further includes processing at least information associated with the second plurality of interference indicators, and selecting a second interference indicator for the second control period from the second plurality of interference indicators based on at least information associated with the second plurality of interference indicators, where the selected second interference indicator corresponds to one of the second plurality of sectors. In an embodiment, the method further includes determining a second gain indicator for the second control period corresponding to both the user and the one of the second plurality of sectors, processing information associated with the second gain indicator, and determining a second uplink transmission power for a third control period based on at least information associated with the second gain indicator and the selected second interference indicator. In some embodiments, the second base station and the first base station are the same. Alternatively, the second base station and the first base station are different.

In an embodiment, the second control period is a period that immediately follows the first control period and the third control period is a period that immediately follows the second control period. In some embodiments, the first control period, the second control period, and the third period each equals to a constant time duration. Alternatively, the first control period, the second control period, and the third period each is a different time duration.

In an embodiment, each of the second plurality of interference indicators is respectively associated with an interference metric $\kappa_{j2}$ broadcast by one sector j2 at an end of the second control period, j2 being an index for representing one of the second plurality of sectors. In some embodiments, the interference metric $\kappa_{j2}$ is defined as a ratio of a predetermined interference constraint $I_{max2}$ for the sector j2 subtracting a background noise $N_{j2}$ at the sector j2 for the second control period over an inter-sector interference $I_{j2}$ experienced by the sector j2 at the second control period. In some instances, selecting a second interference indicator for the second control period from the second plurality of interference indicators includes determining an sector j2c corresponding to an interference metric value of $\kappa_{j2c}$, that is equal to or less than any $\kappa_{j2}$ for any sector j2 of the second plurality of sectors within the second control period. The sector j2c can be the same as or different from the sector j1c. In an embodiment, the second gain indicator is a channel gain $g_{ij2c}$ from the user i to the sector j2c. In some cases, selecting a first interference indicator for the first control period from the first plurality of interference indicators includes determining a sector j1c corresponding to a value of $\kappa_{j1c}$, equal to or less than any $\kappa_{j1}$ for the sector j1 of the first plurality of sectors within the first control period.

In an embodiment, determining a second uplink transmission power $P_i(3)$ for a third control period for a user i includes multiplying the first uplink transmission power for the second control period $P_i(2)$ with the value of $\kappa_{j2c}$. In some embodiments, determining a second uplink transmission power $P_i(3)$ for a third control period for the user i further includes adjusting the second uplink transmission power with an additional term including a convergence factor multiplying the first uplink transmission power and the second gain indicator $g_{ij2c}$, where the convergence factor is a constant $\alpha$ between 0 and 1.

In an embodiment, a system for determining transmission power for a user in a network, the system includes one or more components configured to receive, by a user, a plurality of interference indicators, where the user being associated with a sector, the plurality of interference indicators corresponds to a plurality of sectors respectively, and each of the plurality of sectors is associated with one of a plurality of users and a base station. The plurality of interference indicators is each associated with an interference metric value defined as a ratio of a quantity that equals to a predetermined interference constraint for a sector subtracting a background noise at said sector over inter-sector interferences experienced by the sector from other sectors. The one or more components are also configured to process at least information associated with the plurality of interference indicators, and select an interference indicator from the plurality of interference indicators based on at least information associated with the plurality of interference indicators, where the selected interference indicator corresponds to one of the plurality of sectors. In addition, the one or more components are configured to determine a gain indicator corresponding to both the user and the one of the plurality of sectors, process information associated with the gain indicator, and determine an uplink transmission power based on at least information associated with the gain indicator and the selected interference indicator.

In some embodiments, the one or more components all reside on the user in the network, and, in some cases, the user includes an access terminal in an orthogonal frequency division multiple access (OFDMA) network. In an embodiment, the one or more components all reside on the base station. Alternatively, some of the one or more components reside on the user and rest of the one or more components reside on the base station.

In an embodiment, the plurality of interference indicators is broadcast respectively by the plurality of sectors to each and every user. The selected interference indicator can correspond to a sector with a smallest interference metric value, and the gain indicator can be updated by the user based on an estimation from a forward link pilot of the one of the plurality of sectors.

In an embodiment, the uplink transmission power is determined iteratively for the user at a next control period based on the uplink transmission power multiplying the selected interference indicator at a current control period. In some embodiments, the next control period is a period that immediately follows the current control period. In an embodiment, the uplink transmission power at the next control period is further adjusted using an additional term including a convergence factor multiplying the transmission power and the gain indicator at the current control period. In some cases, the convergence factor is a predetermined constant between 0 and 1.

While the above is a full description of the specific embodiments, various modifications, alternative constructions and equivalents may be used. Although the above method has been described using a selected sequence of steps, any combination of any elements of steps described as well as others may be used. Additionally, certain steps may be combined and/or eliminated depending upon the embodiment. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for determining transmission power for a user in a network, the method comprising:
receiving, by a user, a plurality of interference indicators, the user being associated with a sector, the plurality of interference indicators corresponding to a plurality of sectors respectively, each of the plurality of sectors being associated with one of a plurality of users and a base station, wherein each of the plurality of interference indicators respectively corresponds to an interference metric $\kappa_j$ associated with one sector j, j being an index for representing any one of the plurality of sectors, and wherein the interference metric $\kappa_j$ is broadcast by the sector j as a ratio of a quantity that equals to a predetermined interference constraint $I_{max}$ for the sector j subtracting a background noise $N_j$ at the sector j over inter-sector interference $I_j$ present in the sector j arising from other sectors;
processing at least information associated with the plurality of interference indicators;
selecting an interference indicator from the plurality of interference indicators based on at least information associated with the plurality of interference indicators, the selected interference indicator corresponding to one of the plurality of sectors;
determining a gain indicator corresponding to both the terminal and the one of the plurality of sectors;
processing information associated with the gain indicator; and
determining a transmission power for the user based on at least information associated with the gain indicator and the selected interference indicator.

2. The method of claim 1 wherein the user is denoted by index i ranging from 1 to N, N being an integer larger than 1.

3. The method of claim 2 wherein the user comprises a mobile station connected with a communication network.

4. The method of claim 2 wherein the user comprises an access terminal in a sector of an orthogonal frequency division multiple access (OFDMA) network.

5. The method of claim 2 wherein the transmission power of the user i is denoted as $P_i(m)$ for a control period m, $P_i(m)$ being equal to a maximum power value P multiplying an attenuation factor $\gamma_i(m)$ corresponding to the user i for the control period m.

6. The method of claim 5 wherein the control period in is an index with consecutive integer numbers each representing one of a series of time durations for a user to adjust uplink transmission power in the network.

7. The method of claim 6 wherein the determining a transmission power of the user i is at least associated with determining an attenuation factor $\gamma_i(m+1)$ for a next control period m+1 iteratively based on the attenuation factor $\gamma_i(m)$ at the control period m.

8. The method of claim 7 wherein the determining a transmission power of the user i is further associated with a convergence factor multiplying with channel gain $g_{ijc}$, the convergence factor being a pre-determined constant $\alpha$ between 0 and 1.

9. The method of claim 8 wherein the transmission power of the user i is updated iteratively from a control period m to a next control period m+1 as follows:

$$P\gamma_i(m+1) = P\gamma_i(m)\kappa_j(m).$$

10. The method of claim 1 wherein inter-sector interference $I_j$ includes a combined interference produced by all network users respectively associated with one of the plurality of sectors other than the sector j.

11. The method of claim 1 wherein the selecting an interference indicator from the plurality of interference indicators comprises determining one sector jc corresponding to a smallest value of interference metric $\kappa_{jc}$ for a given control period.

12. The method of claim 11 wherein the determining the gain indicator comprises determining a channel gain $g_{ijc}$ from user i to the determined sector jc.

13. A method for determining transmission power for a user in a network, the method comprising:
receiving, by a user, a first plurality of interference indicators for a first control period, the user being associated with a sector, the first plurality of interference indicators corresponding to a first plurality of sectors respectively, each of the first plurality of sectors being associated with one of a first plurality of users and a first base station;
processing at least information associated with the first plurality of interference indicators;
selecting a first interference indicator for the first control period from the first plurality of interference indicators based on at least information associated with the first plurality of interference indicators, the selected first interference indicator corresponding to one of the first plurality of sectors, wherein each of the first plurality of interference indicators is respectively associated with an interference metric $\kappa_{j1}$ broadcast by one sector j1 at an end of the first control period, j1 being an index for representing one of the first plurality of sectors, wherein the interference metric $\kappa_{j1}$ is defined as a ratio of a quantity that equals to an interference constraint Imax1 predetermined for the sector j1 subtracting a background noise $N_{j1}$ at the sector j1 for the first control period over an inter-sector interference $I_{j1}$ experienced by the sector j1 at the first control period;
determining a first gain indicator for the first control period corresponding to both the user and the one of the first plurality of sectors;
processing information associated with the first gain indicator; and determining a first uplink transmission power for a second control period based on at least information associated with the first gain indicator and the selected first interference indicator.

14. The method of claim 13 wherein the selecting a first interference indicator for the first control period from the first plurality of interference indicators comprises determining a sector j1c corresponding to a value of $\kappa_{j1c}$, equal to or less than any $\kappa_{j1}$ for the sector j1 of the first plurality of sectors within the first control period.

15. The method of claim 13 wherein the first uplink transmission power for the second control period is denoted as $P_i(2)$ with i being index for representing the user, $P_i(2)$ being equal to a maximum power value P multiplying an attenuation factor $\gamma_i(2)$ corresponding to the user i at the second control period.

16. The method of claim 15, further comprising:
receiving, by the user, a second plurality of interference indicators for the second control period, the second plurality of interference indicators corresponding to a second plurality of sectors respectively, each of the second plurality of sectors being associated with one of a second plurality of users and a second base station;
processing at least information associated with the second plurality of interference indicators;
selecting a second interference indicator for the second control period from the second plurality of interference indicators based on at least information associated with the second plurality of interference indicators, the selected second interference indicator corresponding to one of the second plurality of sectors;
determining a second gain indicator for the second control period corresponding to both the user and the one of the second plurality of sectors;
processing information associated with the second gain indicator; and
determining a second uplink transmission power for a third control period based on at least information associated with the second gain indicator and the selected second interference indicator.

17. The method of claim 16 wherein the first, second and third control periods are sequential, and at least one of the second and third control periods is a period that immediately follows a preceding control period.

18. The method of claim 17 wherein the first control period, the second control period, and the third period each equals to a constant time duration.

19. The method of claim 17 wherein at least two of the first control period, the second control period, and the third period are time periods having a different time duration.

20. The method of claim 16 wherein each of the second plurality of interference indicators is respectively associated with an interference metric $\kappa_{j2}$ broadcast by one sector j2 at an end of the second control period, j2 being an index for representing one of the second plurality of sectors.

21. The method of claim 20 wherein the interference metric $\kappa_{j2}$ is defined as a ratio of a predetermined interference constraint $I_{max2}$ for the sector j2 subtracting a background noise $N_{j2}$ at the sector j2 for the second control period over an inter-sector interference $I_{j2}$ experienced by the sector j2 at the second control period.

22. The method of claim 21 wherein the selecting a second interference indicator for the second control period from the second plurality of interference indicators comprises determining an sector j2c corresponding to an interference metric value of $\kappa_{j2c}$, that is equal to or less than any $\kappa_{j2}$ for any sector j2 of the second plurality of sectors within the second control period.

23. The method of claim 22 wherein the selecting a first interference indicator for the first control period from the first plurality of interference indicators comprises determining a sector j1c corresponding to a value of $\kappa_{j1c}$, equal to or less than any $\kappa_{j1}$ for the sector j1 of the first plurality of sectors within the first control period.

24. The method of claim 23 wherein the sector j2c is different from the sector j1c.

25. The method of claim 23 wherein the sector j2c is the same as the sector j1c.

26. The method of claim 22 wherein the second gain indicator is a channel gain $g_{ij2c}$ from the user i to the sector j2c.

27. The method of claim 22 wherein the determining a second uplink transmission power $P_i(3)$ for a third control period for a user i comprises multiplying the first uplink transmission power for the second control period $P_i(2)$ with the value of $\kappa_{j2c}$.

28. The method of claim 27 wherein the determining a second uplink transmission power $P_i(3)$ for a third control period for the user i further comprises adjusting the second uplink transmission power with an additional term including a convergence factor multiplying the first uplink transmission power and the second gain indicator $g_{ij2c}$, the convergence factor being a constant $\alpha$ between 0 and 1.

29. A system for determining transmission power for a user in a network, the system comprising:
one or more components configured to:
receive, by a user, a plurality of interference indicators, the user being associated with a sector, the plurality of interference indicators corresponding to a plurality of sectors respectively, each of the plurality of sectors being associated with one of a plurality of users and a base station, wherein the plurality of interference indicators each is associated with an interference metric value defined as a ratio of a quantity that equals to a predetermined interference constraint for a sector subtracting a background noise at said sector over inter-sector interferences experienced by the sector from other sectors;
process at least information associated with the plurality of interference indicators;
select an interference indicator from the plurality of interference indicators based on at least information associated with the plurality of interference indicators, the selected interference indicator corresponding to one of the plurality of sectors;
determine a gain indicator corresponding to both the user and the one of the plurality of sectors;
process information associated with the gain indicator; and
determine an uplink transmission power based on at least information associated with the gain indicator and the selected interference indicator.

30. The system of claim 29 wherein the one or more components all reside on the user in the network.

31. The system of claim 29 wherein the user comprises an access terminal in an orthogonal frequency division multiple access (OFDMA) network.

32. The system of claim 29 wherein the one or more components all reside on the base station.

33. The system of claim 29 wherein some of the one or more components reside on the user and rest of the one or more components reside on the base station.

34. The system of claim 29 wherein the plurality of interference indicators is broadcast respectively by the plurality of sectors to each and every user.

35. The system of claim 29 wherein the selected interference indicator corresponds to a sector with a smallest interference metric value.

36. The system of claim 35 wherein the gain indicator is updated by the user based on an estimation from a forward link pilot of the one of the plurality of sectors.

37. The system of claim 36 wherein the uplink transmission power is determined iteratively for the user at a next control period based on the uplink transmission power multiplying the selected interference indicator at a current control period.

38. The system of claim 37 wherein the next control period is a period that immediately follows the current control period.

39. The system of claim 38 wherein the uplink transmission power at the next control period is further adjusted using an additional term including a convergence factor multiplying the transmission power and the gain indicator at the current control period.

40. The system of claim 39 wherein the convergence factor is a predetermined constant between 0 and 1.

* * * * *

UNITED STATES PATENT AND TRADEMARK OFFICE
CERTIFICATE OF CORRECTION

| | | |
|---|---|---|
| PATENT NO. | : 8,046,019 B2 | Page 1 of 1 |
| APPLICATION NO. | : 11/773395 | |
| DATED | : October 25, 2011 | |
| INVENTOR(S) | : Hosein | |

It is certified that error appears in the above-identified patent and that said Letters Patent is hereby corrected as shown below:

IN THE CLAIMS:

In Col. 16, line 4, claim 6, delete "period in" and insert --period m--.

Signed and Sealed this
Seventeenth Day of January, 2012

David J. Kappos
*Director of the United States Patent and Trademark Office*